(12) United States Patent
Chua et al.

(10) Patent No.: US 9,858,678 B2
(45) Date of Patent: Jan. 2, 2018

(54) METHOD AND SYSTEM FOR HUMAN MOTION RECOGNITION

(71) Applicant: AGENCY FOR SCIENCE, TECHNOLOGY AND RESEARCH, Singapore (SG)

(72) Inventors: Teck Wee Chua, Singapore (SG); Nam Trung Pham, Singapore (SG); Karianto Leman, Singapore (SG); Richard Philippe Chang, Singapore (SG); Yue Wang, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 58 days.

(21) Appl. No.: 14/898,346

(22) PCT Filed: Jun. 12, 2014

(86) PCT No.: PCT/SG2014/000275
§ 371 (c)(1),
(2) Date: Dec. 14, 2015

(87) PCT Pub. No.: WO2014/200437
PCT Pub. Date: Dec. 18, 2014

(65) Prior Publication Data
US 2016/0148391 A1 May 26, 2016

(30) Foreign Application Priority Data
Jun. 12, 2013 (SG) .................................. 201304548

(51) Int. Cl.
*G06K 9/00* (2006.01)
*G06T 7/20* (2017.01)
(Continued)

(52) U.S. Cl.
CPC ........ *G06T 7/2033* (2013.01); *G06K 9/00342* (2013.01); *G06K 9/00375* (2013.01);
(Continued)

(58) Field of Classification Search
CPC ... G06T 7/20; G06T 7/00; G06K 9/00; G06K 9/62; G06K 9/46; G06K 9/48
(Continued)

(56) References Cited

U.S. PATENT DOCUMENTS

2010/0310157 A1 12/2010 Kim et al.
2012/0070070 A1 3/2012 Litvak

FOREIGN PATENT DOCUMENTS

WO 2014200437 A1 12/2014

OTHER PUBLICATIONS

Kizler, N., "Understanding Human Motion: Recognition and Retrieval of Human Activities, A dissertation submitted o the Department of Computer Engineering and the Institute of Engineering and Science of Bilkent University in partial ulfillment of the requirements for the Degree of Doctor of Philosophy," May 2008,141p.*
(Continued)

*Primary Examiner* — Gregory F Cunningham
(74) *Attorney, Agent, or Firm* — Conley Rose, P.C.

(57) ABSTRACT

A system and method for human motion recognition are provided. The system includes a video sequence decomposer, a feature extractor, and a motion recognition module. The video sequence decomposer decomposes a video sequence into a plurality of atomic actions. The feature extractor extracts features from each of the plurality of atomic actions, the features including at least a motion feature and a shape feature. And the motion recognition module performs motion recognition for each of the plurality of atomic actions in response to the features.

18 Claims, 7 Drawing Sheets

(51) Int. Cl.
G06K 9/46 (2006.01)
G06K 9/48 (2006.01)
G06K 9/62 (2006.01)
G06T 7/50 (2017.01)
G06T 7/246 (2017.01)

(52) U.S. Cl.
CPC ......... *G06K 9/4642* (2013.01); *G06K 9/4676* (2013.01); *G06K 9/481* (2013.01); *G06K 9/6223* (2013.01); *G06T 7/246* (2017.01); *G06T 7/50* (2017.01); *G06T 2207/30196* (2013.01)

(58) Field of Classification Search
USPC ......................................................... 382/103
See application file for complete search history.

(56) References Cited

OTHER PUBLICATIONS

Michal Seeman and Pavel Zemcil, "Histogram Smoothing for Bilateral Filter" 2009, retreived from Internet on Apr. 6, 2017. Retrieved from URL:<http://gravisma.zcu.cz/GraVisMa-2009/Papers_2009/!_2009_GraVisMa_proceedings-FINAL.pdf>.*

Michal Seeman and Pavel Zemcil, "Histogram Smoothing for Bilateral Filter" 2009, retreived from Internet on Apr. 6, 2017. Retrieved from URL:<http://gravisma.zcu.cz/GraVisMa-2009/Papers_2009/!_2009_GraVisMaj)roceedings-FINAL.pdf>.*

Ikizler, N., "Understanding Human Motion: Recognition and Retrieval of Human Activities, A dissertation submitted to the Department of Computer Engineering and the Institute of Engineering and Science of Bilkent University in partial fulfillment of the requirements for the Degree of Doctor of Philosophy," May 2008, 141p.

Turaga, P., Machine Recognition of Human Activities: A Survey, Circuits and Systems for Video Technology, IEEE Transactions on Circuits and Systems for Video Technology, vol. 18, Issue 11, Nov. 2008, pp. 1473-1488 (Abstract only, 2 p.).

Nayak et al., "Motion Pattern Analysis for Modeling and Recognition of Complex Human Activities, Guide to Video Analysis of Humans: Looking at People," New York, Springer-Verlag 2011, pp. 289-310.

Thurau, C., "Behavior Histograms for Action Recognition and Human Detection," Human Motion—Understanding, Modeling, Capture and Animation, Second Workshop, Human Motion 2007, Rio de Janeiro, Brazil, Oct. 20, 2007, pp. 299-312.

Astar et al, International Preliminary Report on Patentability dated Sep. 2, 2014, PCT App. No. PCT/SG2014/000275, 5 p.

Astar et al., International Search Report dated Sep. 2, 2014, PCT App. No. PCT/SG2014/000275, 4 p.

* cited by examiner

200  210  220
FIG. 2A  FIG. 2B  FIG. 2C
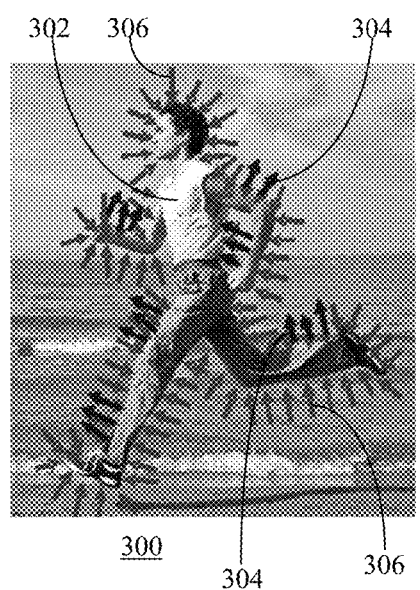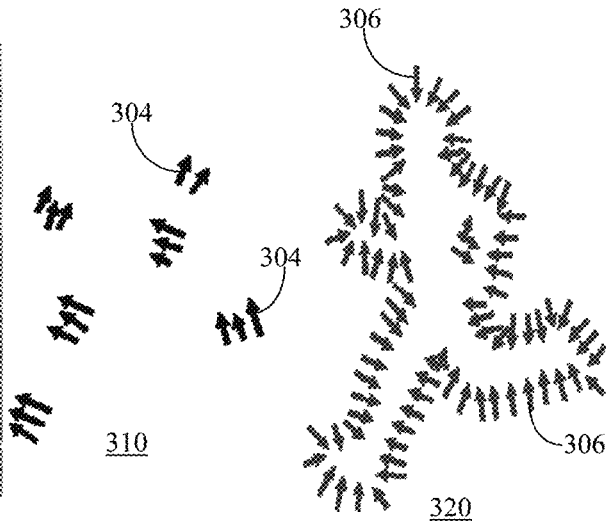
FIG. 3A  FIG. 3B  FIG. 3C

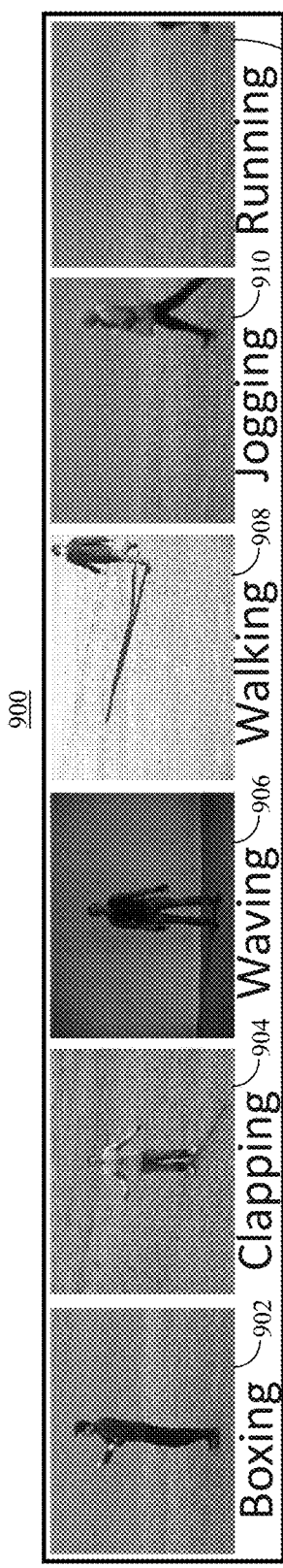
FIG. 9A
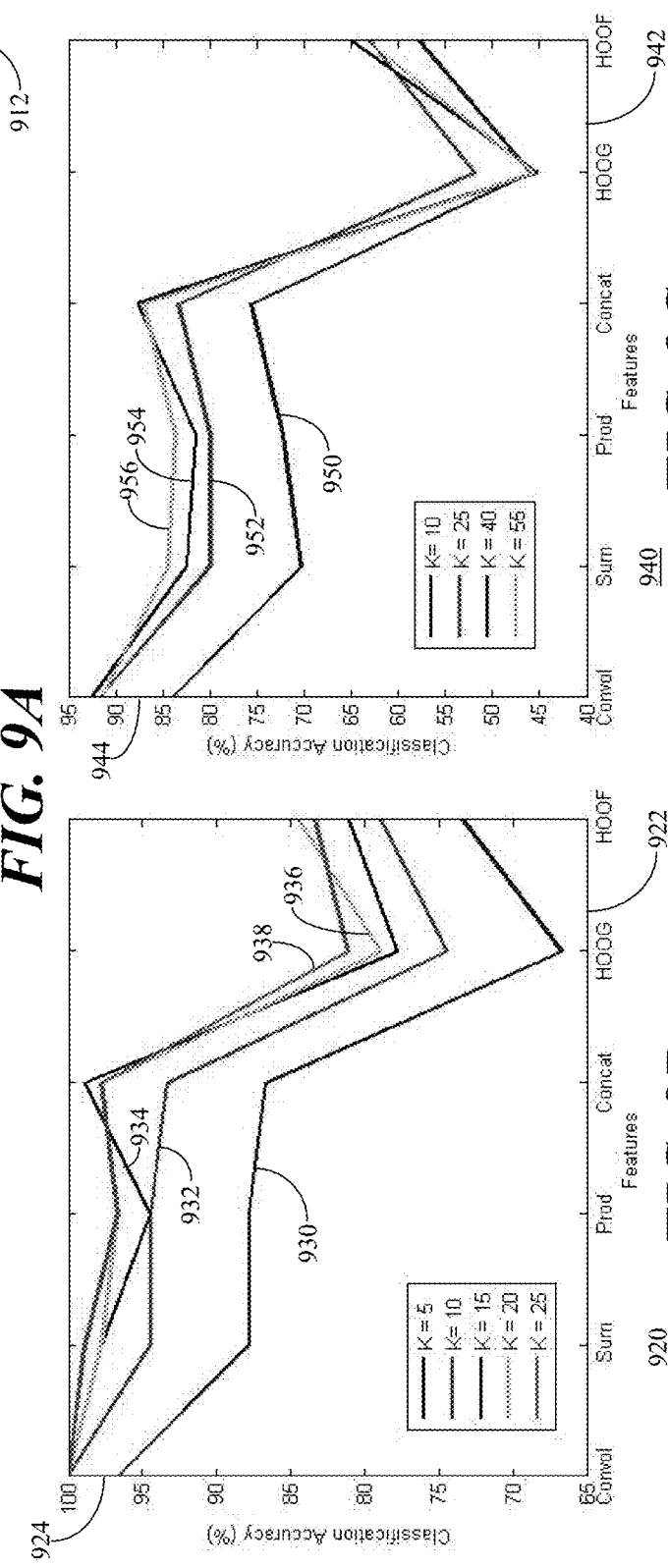
FIG. 9B
FIG. 9C

FIG. 10

METHOD AND SYSTEM FOR HUMAN MOTION RECOGNITION

CROSS-REFERENCE TO RELATED APPLICATION

The present application is the U.S. National Stage under 35 U.S.C. §371 of International Patent Application No. PCT/SG2014/000275, filed Jun. 12, 2014, which claims priority to Singapore Application No. SG 201304548-9, filed Jun. 12, 2013, the disclosures of which are hereby incorporated herein by reference.

FIELD OF THE INVENTION

The present invention generally relates to surveillance and recognition technology, and more particularly relates to a system and method for human motion recognition.

BACKGROUND OF THE DISCLOSURE

There has been a surge, in recent years, towards the study of human action recognition because it is fundamental to many computer vision applications such as video surveillance, human-computer interface, and content-based video retrieval. While the human brain can recognize an action in a seemingly effortless fashion, recognition solutions using computers have, in many cases, proved to be immensely difficult.

One challenge is the choice of optimal representations for human actions. Ideally, the representation should be robust against inter- or intra-variations, noises, temporal variations, and sufficiently rich to differentiate a large number of possible actions. Practically, such representations do not exist.

It is well documented that human actions can be encoded as spatial information of body poses and dynamic information of body motions. However, some actions cannot be distinguished solely using shape and/or motion features. For example, a skip action may look very similar to a run action if only the pose of the body is observed.

The classification task would be simplified if the motion flow of the entire body is considered simultaneously. Using this approach, one would expect that the skip action generates more vertical flows (upward and downward flows) than the run action. In addition, actions such as jogging, walking and running can be easily confused if only the pose information is used due to the similarity of postures in the action sequences.

Likewise, there are some actions which cannot be fully described by motion feature alone. Combining both motion and shape cues potentially provides complementary information about an action. Thus, conventionally, motion and shape feature vectors are concatenated to form a super vector. However, the super vector obtained through such concatenation may not explicitly convey the underlying action. Moreover, the super vector is unnecessarily long and requires complex feature dimension reduction techniques.

Thus, what is needed is a system and method for efficient recognition of human motion. Furthermore, other desirable features and characteristics will become apparent from the subsequent detailed description and the appended claims, taken in conjunction with the accompanying drawings and this background of the disclosure.

SUMMARY

According to the Detailed Description, a method for human motion recognition is provided. The method includes decomposing a video sequence into a plurality of atomic actions and extracting features from each of the plurality of atomic actions. The features extracted include at least a motion feature and a shape feature. The method further includes performing motion recognition for each of the plurality of atomic actions in response to the features.

In accordance with another aspect, a system for human motion recognition is provided. The system includes a video sequence decomposer, a feature extractor, and a motion recognition module. The video sequence decomposer decomposes a video sequence into a plurality of atomic actions. The feature extractor extracts features from each of the plurality of atomic actions, the features including at least a motion feature and a shape feature. And the motion recognition module performs motion recognition for each of the plurality of atomic actions in response to the features.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with a present embodiment.

FIG. 1, comprising FIGS. 1A to 1D, pictorially illustrates human motion action sequences, wherein

FIG. 2, comprising FIGS. 2A, 2B and 2C, depicts decomposition of human walking action in accordance with a present embodiment, wherein FIG. 2A depicts right-leg stepping, FIG. 2B two-leg crossing, and FIG. 2C left-leg stepping.

FIG. 3, comprising FIGS. 3A, 3B and 3C, depicts motion flow and shape flow vectors of the human motion of running in accordance with the present embodiment, wherein FIG. 3A depicts the motion of running with both vectors, FIG. 3B depicts the motion flow vectors only, and FIG. 3C depicts the shape flow vectors only.

FIG. 4, comprising FIGS. 4A and 4B, depicts illustrations of histogram binning in accordance with the present embodiment, wherein FIG. 4A depicts a graph of the human motion vectors of FIG. 3 and FIG. 4B depicts histogram binning the vectors of FIG. 4A in accordance with the present embodiment.

FIG. 5, comprising FIGS. 5A and 5B, depicts regional concatenation histogram binning in accordance with the present embodiment, wherein FIG. 5A depicts a bounding box illustrating a human motions and divided into four regions and FIG. 5B depicts concatenation of resultant histograms from each region.

FIG. 9, comprising FIGS. 9A, 9B and 9C, depicts motion recognition in accordance with the present embodiment of six different human action sequences from two different human action sequence datasets, wherein FIG. 9A illustrates the six different human action sequences utilized for the comparison, FIG. 9B is a graph of the accuracy of recognition of various human action features in a first human action sequence dataset by motion recognition in accordance with the present embodiment, and FIG. 9C is a graph of the accuracy of recognition of the various human action features in a second human action sequence dataset by motion recognition in accordance with the present embodiment.

And FIG. 10 illustrates a 6×6 matrix of the motion recognition in accordance with the present embodiment of the six different human action sequences in both human action sequence datasets of FIG. 9 where the six different human action sequences are listed along the vertical and the recognized human actions are listed along the horizontal.

Skilled artisans will appreciate that elements in the figures are illustrated for simplicity and clarity and have not necessarily been depicted to scale. For example, the dimensions of some of the elements in the block diagrams or flowcharts may be exaggerated in respect to other elements to help to improve understanding of the present embodiments.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. It is the intent of this invention to present an efficient and recognition of human action with improved accuracy.

Figure 1A:
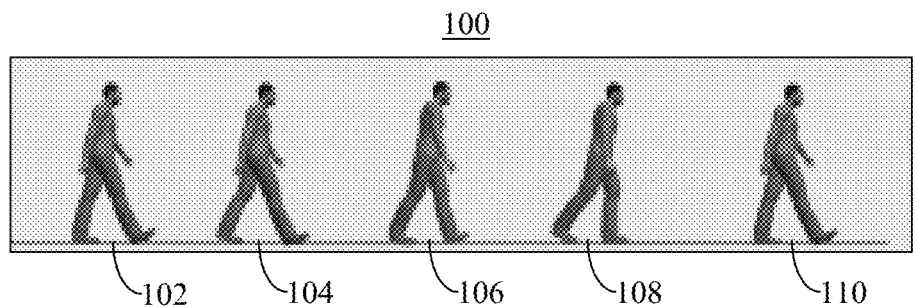
FIG. 1A illustrates action sequences of the human motion of walk.
Figure 1B:
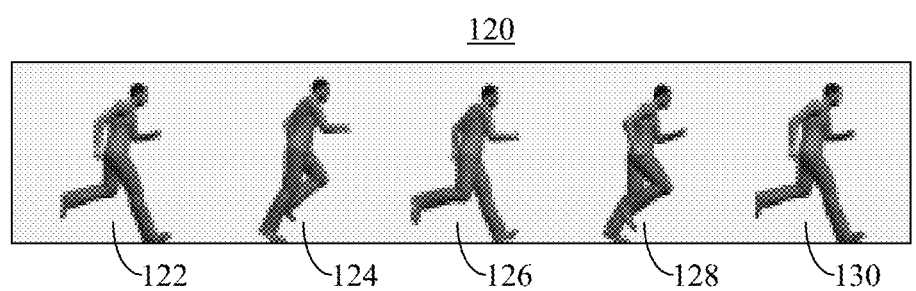
FIG. 1B illustrates action sequences of the human motion of run.
Figure 1C:
FIG. 1C illustrates the human motion of skip.
Figure 1D:
FIG. 1D illustrates the human motion of run for comparison to the human motion of skip (FIG. 1C).

As stated above, human actions can be encoded as spatial information of body poses and dynamic information of body motions. Referring to FIG. 1, comprising FIGS. 1A to 1D, action sequences of human actions are shown. In FIG. 1A, an action sequence 100 depicts five views 102, 104, 106, 108, 110 of a person walking. In FIG. 1B, an action sequence 120 depicts five views 122, 124, 126, 128, 130 of a person running. Some actions cannot be distinguished solely using shape and/or motion features. In FIGS. 1C and 1D, two views 140, 150 depict single body poses of two different human actions. It is difficult to distinguish a skip action in the view 140 from a run action in the view 150 because when only the pose of the body is observed at a single point in the action, the skip action view 140 appears very similar to the run action view 150.

In accordance with the present embodiment, a complex human action sequence is decomposed into a sequence of elementary building blocks, known as 'atomic actions'. Referring to FIG. 2, comprising FIGS. 2A, 2B and 2C, the human action of walking is broken down into several atomic actions 200, 210, 220. FIG. 2A depicts the atomic action 200 of right-leg stepping, FIG. 2B depicts the atomic action 210 of two-leg crossing, and FIG. 2C depicts the atomic action 220 left-leg crossing.

Shape and motion are the two most important cues for actions, and atomic actions can be 'synthesized' from both elements. FIG. 3, comprising FIGS. 3A, 3B and 3C, illustrates these cues. In the view 300 of FIG. 3A an atomic action of a person 302 running is shown. A first set of vectors 304 are vectors depicting motion flow (e.g., right forearm moving up, left forearm moving forward, left leg moving forward, right lower leg moving up). The first set of vectors 304 are extracted into a motion flow vector view 310 in FIG. 3B. A second set of vectors 306 are vectors depicting shape flow (i.e., vectors identifying the outline of the shape). The second set of vectors 306 are extracted into a shape flow vector view 320 in FIG. 3B.

Observing shape and motion is a very natural way to recognize an action. The visual cortex in the brain has two pathways to process shape and motion information. Motivated by the robustness of histograms of features, in accordance with a present embodiment a histogram-of-oriented gradient (HOOG) and a histogram-of-oriented optical flow (HOOF) are used as shape and motion descriptors, respectively. HOOG is also be used as a pose descriptor.

Figure 4A:
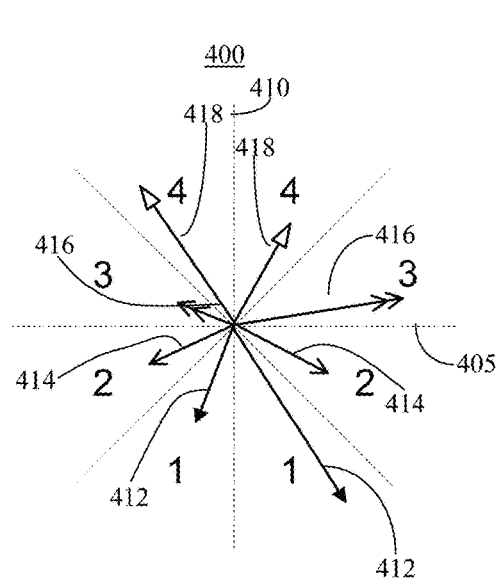
Figure 4B:
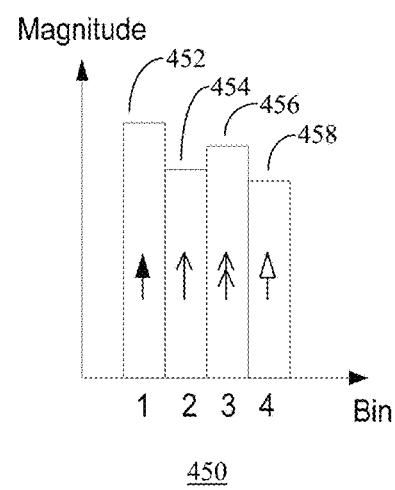

Such a feature is more robust against scale variation and the change of motion direction. A method for extraction of the HOOF and the HOOG in accordance with the present embodiment is illustrated in FIG. 4, comprising FIGS. 4A and 4B. In FIG. 4A, a graph 400 of human motion vectors includes a horizontal axis 405 and a vertical axis 410. Pose and shape vectors 412, 414, 416, 418 plotted on the graph 400 and are divided in accordance with their primary angles from the horizontal axis 405 (i.e., their symmetry about the vertical axis 410).

Referring to FIG. 4B, a four-bin histogram 450 bins the vectors 412, 414, 416, 418 in accordance with their symmetry about the vertical axis 410—that is the vectors 412 are binned in bin 452, the vectors 414 are binned in bin 454, the vectors 416 are binned in bin 456, and the vectors 418 are binned in bin 458. In this manner, the histogram bar graph 450 depicts human motion feature extraction of pose, shape and motion as a histogram combination of the HOOG and the HOOF. The histogram 450 is normalized to sum up to unity to make it scale-invariant. In this manner, there is no need to normalize the size of each of the bounding boxes 452, 454, 456, 458.

As a result, the histogram of a person moving from left to right will be the same as a histogram of a person moving from right to left (i.e., the method in accordance with the present embodiment is direction indiscriminate). The contribution of each vector is proportional to its magnitude and the histogram is normalized to sum up to unity to make it scale-invariant.

Figure 5A:
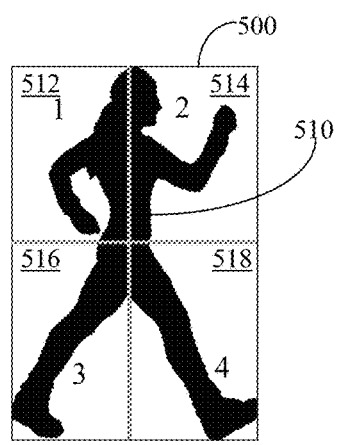
Figure 5B:
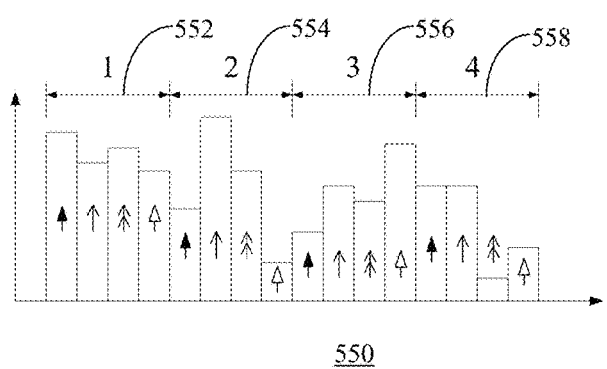

FIG. 5, comprising FIGS. 5A and 5B, depicts regional concatenation histogram binning in accordance with the present embodiment. Spatial information is considered by dividing a bounding box 500 of a subject 510 into a 4×4 matrix of regions 512, 514, 516, 518, as shown in FIG. 5A. A resultant histogram 550 depicts concatenation of four-bin histograms 552, 554, 556, 558 from each region.

Figure 6:
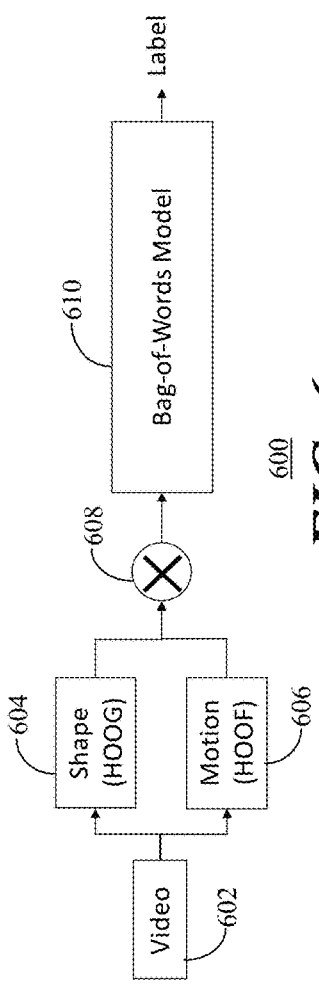
FIG. 6 depicts a block diagram of a system for resolving an action video into a collection of repetitive atomic actions in accordance with the present embodiment.

As discussed above in regards to FIG. 2, a complex action can be decomposed into a sequence of elementary building blocks known as atomic actions. Referring to FIG. 6, a block diagram 600 depicts a system in accordance with the present embodiment. An atomic action is defined as the action performed at video frame t of a video 602. It is represented by a shape histogram (i.e., HOOG) 604 extracted at frame t and an optical flow histogram (i.e., HOOF) 606 computed at frames (t−1) and t. Therefore, the T-frame action video 602 has (T−1) number of atomic actions.

Suppose action, shape, and motion are three discrete random variables: Z; S; M with distribution z[x]; s[x]; and m[x] respectively, where [ ] represents discrete data. s[x] and m[x] are basically the shape and motion histograms computed. In a further assumption, an action is a function of shape and motion, i.e., Z=f(S;M). The simplest function would be a summation:

$$Z = S + M \quad (1)$$

According to probability theory, the sum of discrete random variables will produce a new random variable with distribution that can be determined via convolution. Therefore, the distribution (histogram) of an action can be determined by $$z[x] = s[x] * m[x] = \sum_{k=-\infty}^{k=+\infty} s[k] \cdot m[x-k] \quad (2)$$

where the asterisk '*' denotes the convolution operator. The idea of using a convolution operator is also inspired by success of convolution-based reverb applications in digital signal processing (DSP). In DSP, convolution is a mathematical way of combining two source signals to form an output signal. The output signal bears the characteristics of both sources. Convolution-based reverb is a process for digitally simulating the reverberation of a virtual or physical space. Given the impulse response of a space which can be obtained by recording a short burst of a broadband signal, any "dry" signal (little room or space influence) can be convolved with the impulse response. The result is that the sound appears to have been recorded in that space. Analogously, knowing that an action is characterized by both shape and motion information, an atomic action histogram can be obtained by convolving the corresponding shape histogram (HOOG) 604 and motion histogram (HOOF) 606. The convolution operation 608 is commutative, which means that the order of the inputs does not mathematically matter.

The length of the output is given by the expression $\|s\|+\|m\|-1$. This representation has two major advantages. First, the action histogram is more robust against noises. This is because each bin in the action histogram is influenced by bins in the shape histogram weighted by the motion histogram or vice versa (the commutative property of convolution). Therefore the effect of abrupt changes in the histogram magnitude can be minimized. Second, the action histogram produced using convolution is more discriminative. The ratio of inter-class distance to intra-class distance is measured and the results on a known human action video dataset is shown below in Table 1.

Table 1 shows a comparison of normalized inter-/intra-class distance ratio on a known human action video dataset for different types of feature combination methods where a Hellinger distance measure is used to compare two histograms:

$$D_h(s[x], m[x]) = \left[ 1 - \sum_{\forall x} \sqrt{s[x] \cdot m[x]} \right]^{\frac{1}{2}} \quad (3)$$

A higher value indicates that the feature is potentially more discriminative.

TABLE 1

| Combination Strategies | Ratio |
|---|---|
| Convolution (Conv) | 1.0000 |
| Summation (Sum) | 0.8535 |
| Product (Prod) | 0.8489 |
| Concatenation (Concat) | 0.8743 |

The results suggest that the convolution operation produces feature vectors that are potentially more discriminative than the features obtained through other combination methods.

In one example, an action video is represented as a collection of repetitive atomic actions. The basic concept is illustrated in FIG. 6. Recall that atomic actions are characterized by the convolved shape-motion histogram. A visual codebook can be created by performing K-means clustering on all atomic actions from the training data. The cluster centroids serve as the visual codewords. Next, each atomic action in the video is compared against those codewords and the distances are recorded accordingly. The distance between the atomic action and its nearest codeword is used to weight the histogram bin. The histogram for all relevant codewords in a video is computed by aggregating their respective distances. This final representation allows any lengthy video to be 'compressed' into a compact histogram. The histogram is normalized such that a sum of the bins is unity. The normalization ensures that the histogram distribution is invariant to the video length. For instant, given a particular action class, codewords (i.e., key atomic actions) frequencies for a variable length video remain relatively stable. The aforementioned compact video representation can also be called distance weighted bag-of-automatic-actions (i.e., bag-of-words model 610).

Figure 7:
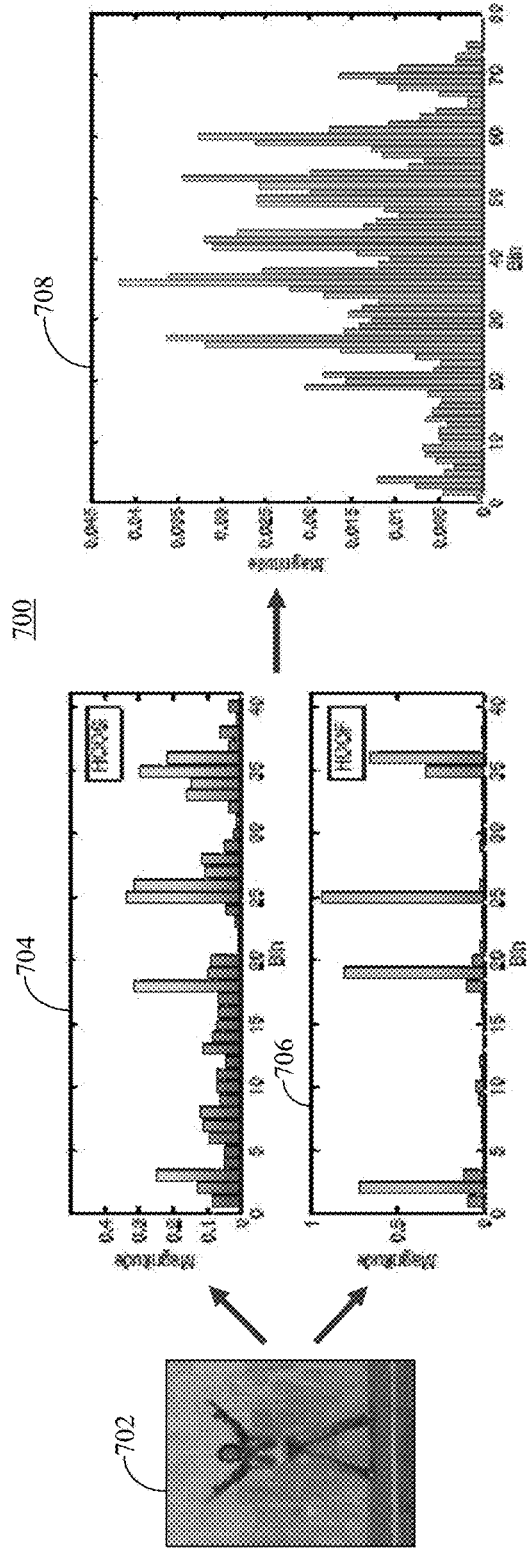
FIG. 7 depicts a representation of a first portion of the operation of the system of FIG. 6 where the action video of human motion on the left is resolved into a combination of regional concatenation of resultant histograms in accordance with the present embodiment.

Referring to FIG. 7, another representation 700 of the system 600 (FIG. 6) takes an atomic action 702 and extracts a HOOG histogram 704 and a HOOF histogram 706. The histographs 704, 706 are convoluted to form a distance weighted bag-of-automatic-actions resultant histograph 708.

Figure 8:
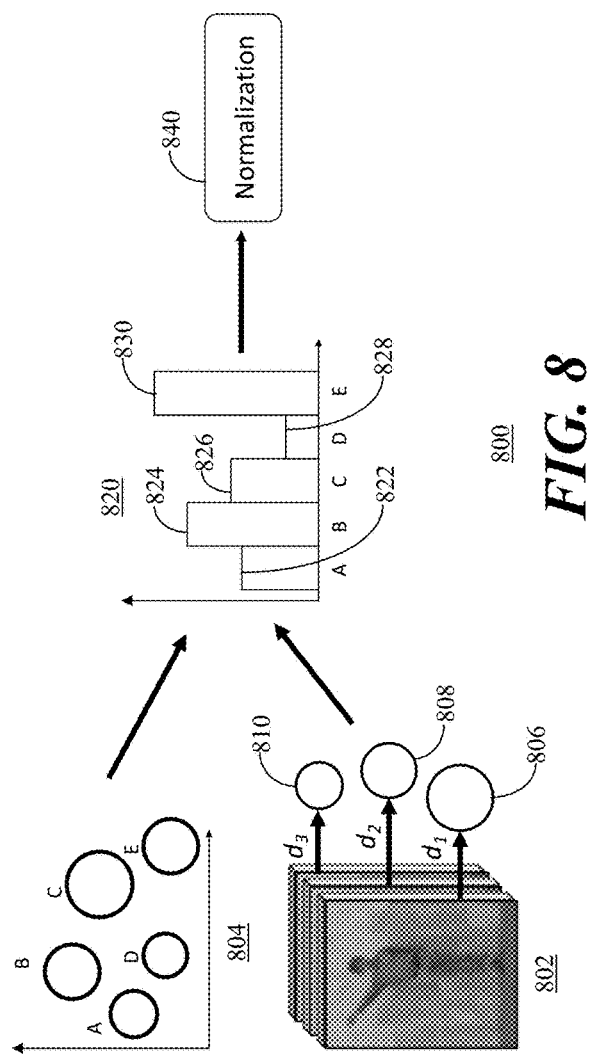
FIG. 8 depicts a representation of a second portion of the operation of the system of FIG. 6 where the resultant histograms are clustered into distance weighted bag-of-automatic-actions in accordance with the present embodiment.

Referring to FIG. 8, a representation 800 of a second portion of the operation of the system 600 where the resultant histograms are clustered into distance weighted bag-of-automatic-actions in accordance with the present embodiment is depicted. A human action is broken down into several atomic actions 802. Histograms of the atomic actions 802 are clustered with a K-means operation as shown in a graph 804 of the clusters. Then, each atomic action 802 is assigned to its closest cluster center 806, 808, 810. In this manner, a contribution of each atomic action 802 to a histogram 820 is inversely proportional to the atomic action's distance from a cluster center. The entire video sequence is then represented in the distance weighted occurrence histogram 820 of visual words in bins 822, 824, 826, 828, 830. At a normalization step 840, a sum of the bins 822, 824, 826, 828, 830 is normalized to one. Thus, the sum of the bins 822, 824, 826, 828, 830 is normalized to one is unity and, thus, is advantageously invariant to a video length of the entire video sequence of the atomic actions 802.

The action recognition framework in accordance with the present embodiment has been evaluated using a first and a second publicly available dataset, identified as the Weizmann dataset (the first dataset) and the KTH dataset (the second dataset). The KTH dataset has been regarded either as one large set with strong intra-subject variations (all-in-one) or as four independent scenarios. In the latter case, each scenario is trained and tested separately. For the KTH-based evaluation, the focus was on the KTH all-in-one case.

Since the KTH dataset size is much larger than the Weizmann dataset size, a K-means algorithm is used to cluster the training data as seen in the graph 804. Each class in the KTH dataset is quantized into five hundred clusters. This quantization can reduce the intra-class variation and computational time. A leave-one-out cross validation (LOOCV) protocol is used in all of the evaluations. Table 2 shows the LOOCV recognition rate.

TABLE 2

Table 2. LOOCV classification accuracy using different number of clusters.

| Dataset | No. of Clusters | Convol | Sum | Prod | Concat | HOOG | HOOF |
|---|---|---|---|---|---|---|---|
| Weizmann | 5 | 96.67 | 87.78 | 87.78 | 86.67 | 66.67 | 73.33 |
|  | 10 | 100 | 94.44 | 94.44 | 93.33 | 74.44 | 78.89 |
|  | 15 | 100 | 97.78 | 94.44 | 98.89 | 77.78 | 81.11 |
|  | 20 | 100 | 97.78 | 96.67 | 97.78 | 78.89 | 84.44 |
|  | 25 | 100 | 98.89 | 96.67 | 97.78 | 81.11 | 83.33 |
| KTH | 10 | 83.94 | 70.25 | 72.22 | 75.58 | 45.88 | 57.73 |
|  | 25 | 91.63 | 79.94 | 79.92 | 83.30 | 51.90 | 63.88 |
|  | 40 | 92.46 | 82.44 | 81.43 | 87.64 | 45.24 | 64.88 |
|  | 55 | 91.46 | 84.43 | 83.62 | 86.97 | 45.58 | 63.37 |

For the Weizmann dataset which only uses five clusters (codewords), the convolved feature yields a much higher accuracy (96.67%) as compared to other features. When the number of clusters is increased further, the convolved feature consistently gives perfect classification accuracy (100%). Using only shape feature (HOOG) or only motion features (HOOF) results in poorer results than using a method in accordance with the present embodiment. On average, the method in accordance with the present embodiment provided about 11.29% overall improvement as compared to other methods.

Referring to FIG. 9, comprising FIGS. 9A, 9B and 9C, motion recognition in accordance with the present embodiment of human action sequences 900 including six different human action sequences 902, 904, 906, 908, 910, 912 from the Weizmann and KTH human action sequence datasets is performed, examined and compared. In FIG. 9A, the six different human action sequences utilized for the comparison are boxing 902, clapping 904, waving 906, walking 908, jogging 910, and running 912. FIG. 9B is a graph 920 of the accuracy (plotted along a vertical axis 924) of recognition of various human action features (plotted along a horizontal axis 922) in the Weizmann human action sequence dataset by motion recognition in accordance with the present embodiment using a variety of K-means clustering operations. Traces plotted on the graph 920 show clustering with a K-means operation where K is equal to five 930, where K is equal to ten 932, where K is equal to fifteen 934, where K is equal to twenty 936, and where K is equal to twenty-five 938. FIG. 9C is a graph 940 of the accuracy (plotted along a vertical axis 944) of recognition of various human action features (plotted along a horizontal axis 942) in the KTH human action sequence dataset by motion recognition in accordance with the present embodiment, also using a variety of K-means clustering operations. Traces plotted on the graph 940 show clustering with a K-means operation where K is equal to ten 950, where K is equal to twenty-five 952, where K is equal to forty 954, and where K is equal to fifty-five 956.

Higher accuracies are attained from the convolved feature for all number of clusters of the KTH dataset. The advantage of using the convolved feature is more prominent in the KTH dataset. The average improvement over all other five features is 19.56%. Again, the HOOG feature alone or the HOOF feature alone fails to provide discriminative information. One important observation from the results in the graphs 920, 940 is that the method and system in accordance with the present embodiment consistently requires a much smaller number of clusters or codewords to give higher accuracy. For example, with only ten clusters, operation in accordance with the present embodiment achieves comparable accuracy with a product feature which uses forty clusters. This confirms the finding that the convolved feature is significantly more discriminative than conventional features.

Figure 10:
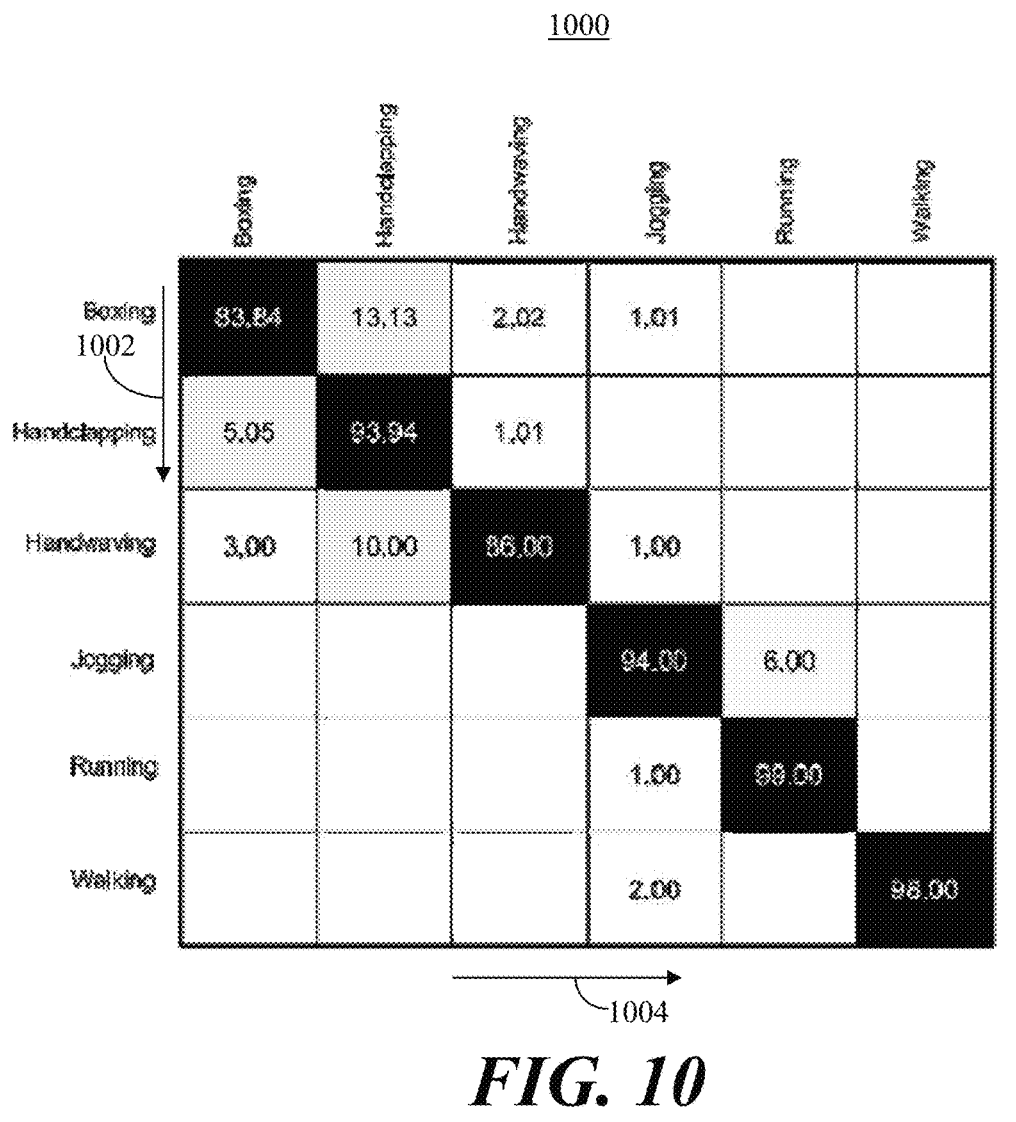

Referring to FIG. 10, results of the operations of FIG. 9 are summarized in a 6×6 matrix 1000 of the motion recognition in accordance with the present embodiment of the six different human action sequences 902, 904, 906, 908, 910, 912 in the KTH human action sequence dataset. The six different human action sequences are listed along the vertical 1002 and the recognized human actions are listed along the horizontal 1004. It can be seen that human motion recognition for walking, jogging and running are in the $90^{th}$ percentile with the only misclassifications in these same three actions. Classifications for handclapping are also in the $90^{th}$ percentile with the only misclassifications falling in handwaving and boxing. While misclassifications for boxing and handwaving are more plentiful, some of these misclassifications may be due to the KTH human action sequence dataset in that some of the atomic actions extracted may include an erroneous bounding box which is extracted off-centered from a body axis of the subject in the bounding box.

In the various examples illustrated above, a method to encode human actions by convolving shape-motion histograms has been presented. The main idea is to produce an output signal (i.e., an action histogram) from the source signals (i.e., shape and motion histograms) so that the output shares the characteristics of both source signals and inputs. The features are also much more discriminative than other hybrid features obtained through other combination strategies such as concatenation, sum, and product. Further, combination of shape and motion features greatly improves the classification results.

In addition, operation in accordance with the present embodiment avoids the need to determine weights manually during feature concatenation. The convolved feature is also very compact and has much lower dimensionality (79-dimensional) as compared to conventional concatenated features of 512-dimensional and 1000-dimensional methodologies. Due to the discriminative nature of the convolution feature, the codebook size is extremely small as compared to conventional methods. Also, the entire video sequence is advantageously represented as a distance weighted occurrence histogram of visual words.

Thus, it can be seen that a system and method for human motion recognition has been provided. The system includes a video sequence decomposer 602, a feature extractor (including HOOG 604 and HOOF 606), and a motion recognition module (including combiner 608 and bag-of-words model module 610). The video sequence decomposer decomposes a video sequence into a plurality of atomic actions. The feature extractor extracts features from each of the plurality of atomic actions, the features including at least a motion feature and a shape feature. And the motion recognition module performs motion recognition for each of the plurality of atomic actions in response to the features.

The motion recognition module performs motion recognition for each of the plurality of atomic actions by convolving histograms of the features of each of the plurality of atomic actions. In regards to the shape feature, the feature extractor extracts a set of shape vectors depicting shape flow from each of the plurality of atomic actions and the motion recognition module convolves histograms of the shape features of each of the plurality of atomic actions by deriving a shape descriptor by determining a histogram-of-oriented gradient of the set of shape vectors for each of the plurality of atomic actions.

In regards to the motion feature, the feature extractor extracts a set of motion vectors depicting motion flow from each of the plurality of atomic actions and the motion recognition module convolves histograms of the motion features of each of the plurality of atomic actions by deriving a motion descriptor by determining a histogram-of-oriented optical flow of the set of motion vectors for each of the plurality of atomic actions.

The features may also include a pose feature, and the feature extractor further extracts a set of pose vectors from each of the plurality of atomic actions and the motion recognition module convolves histograms of the pose features of each of the plurality of atomic actions by deriving a pose descriptor by determining a histogram-of-oriented gradient of the set of pose vectors for each of the plurality of atomic actions. The features may also include a spatial feature, and the feature extractor derives each of a set of shape, motion or pose vectors for each of two or more regions of a bounding box within each of the plurality of atomic actions. The bounding box in each of the plurality of atomic actions is configured to include all of a subject pictured in the one of the plurality of atomic actions. The motion recognition module convolves histograms of each of the shape, motion or pose descriptors to generate a resultant histogram.

The motion recognition module also normalizes the histograms of each of the plurality of atomic actions to sum up to unity and further may include a bag-of-words model module for K-means clustering of all of the atomic actions to generate a distance weighted bag-of-automatic-actions model of the video sequence.

Thus, in accordance with the present embodiment an efficient human motion recognition system and method is provided. The present embodiment is computationally efficient as compared to conventional motion recognition systems and even in comparison to conventional combination strategies such as sum, product and concatenation. The technology of the present embodiment and its various alternates and variants can be used for many scenarios. For example, the present embodiment provides a computationally efficient system and method for many computer vision applications such as video surveillance, human-computer interface, and content-based video retrieval which is robust against inter- or intra-variations, noises, temporal variations, and sufficiently rich to differentiate a large number of possible actions.

Thus, it can be seen that a system and method for human motion recognition which reduces complexity of the recognition methodology has been provided. While exemplary embodiments have been presented in the foregoing detailed description of the invention, it should be appreciated that a vast number of variations exist.

It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention, it being understood that various changes may be made in the function and arrangement of elements and method of operation described in an exemplary embodiment without departing from the scope of the invention as set forth in the appended claims.

What is claimed is:

1. A method for human motion recognition comprising:
   decomposing a video sequence into a plurality of atomic actions;
   extracting features from each of the plurality of atomic actions, the features comprising at least a motion feature and a shape feature; and
   performing motion recognition for each of the plurality of atomic actions in response to the features, wherein the step of performing motion recognition for each of the plurality of atomic actions comprises performing motion recognition for each of the plurality of atomic actions by convolving histograms of the features of each of the plurality of atomic actions.

2. The method in accordance with claim 1 wherein the step of extracting features from each of the plurality of atomic actions comprises extracting a set of shape vectors depicting shape flow from each of the plurality of atomic actions.

3. The method in accordance with claim 2 wherein convolving histograms of the features of each of the plurality of atomic actions comprises deriving a shape descriptor by determining a histogram-of-oriented gradient of the set of shape vectors for each of the plurality of atomic actions.

4. The method in accordance with claim 1 wherein the step of extracting features from each of the plurality of atomic actions comprises extracting a set of motion vectors depicting motion flow from each of the plurality of atomic actions.

5. The method in accordance with claim 4 wherein convolving histograms of the features of each of the plurality of atomic actions comprises deriving a motion descriptor by determining a histogram-of-oriented optical flow of the set of motion vectors for each of the plurality of atomic actions.

6. The method in accordance with claim 1 wherein the features further comprise a pose feature, and wherein the step of extracting features from each of the plurality of atomic actions comprises extracting a set of pose vectors from each of the plurality of atomic actions, and wherein convolving histograms of the features of each of the plurality of atomic actions comprises deriving a pose descriptor by determining a histogram-of-oriented gradient of the set of shape vectors for each of the plurality of atomic actions.

7. The method in accordance with claim 1 wherein the features further comprise a spatial feature, and wherein the step of extracting features from each of the plurality of atomic actions comprises deriving each of a set of shape, motion or pose vectors for each of two or more regions of a bounding box within each of the plurality of atomic actions, the bounding box in each of the plurality of atomic actions configured to include all of a subject pictured in the one of the plurality of atomic actions, and wherein the step of performing motion recognition for each of the plurality of atomic actions comprises convolving histograms of each of the shape, motion or pose descriptors to generate a resultant histogram.

8. The method in accordance with claim 1 wherein convolving histograms of the features of each of the plurality of atomic actions comprises normalization of the histograms of each of the plurality of atomic actions to sum up to unity.

9. The method in accordance with claim 1 further comprising K-means clustering of all of the atomic actions to generate a distance weighted bag-of-automatic-actions model of the video sequence.

10. A system for human motion recognition comprising:
a video sequence decomposer for decomposing a video sequence into a plurality of atomic actions;
a feature extractor for extracting features from each of the plurality of atomic actions, the features comprising at least a motion feature and a shape feature; and
a motion recognition module for performing motion recognition for each of the plurality of atomic actions in response to the features, wherein the motion recognition module performs motion recognition for each of the plurality of atomic actions by convolving histograms of the features of each of the plurality of atomic actions.

11. The system in accordance with claim 10 wherein the feature extractor extracts a set of shape vectors depicting shape flow from each of the plurality of atomic actions.

12. The system in accordance with claim 11 wherein the motion recognition module convolves histograms of the shape features of each of the plurality of atomic actions by deriving a shape descriptor by determining a histogram-of-oriented gradient of the set of shape vectors for each of the plurality of atomic actions.

13. The system in accordance with claim 10 wherein the feature extractor extracts a set of motion vectors depicting motion flow from each of the plurality of atomic actions.

14. The system in accordance with claim 13 wherein the motion recognition module convolves histograms of the motion features of each of the plurality of atomic actions by deriving a motion descriptor by determining a histogram-of-oriented optical flow of the set of motion vectors for each of the plurality of atomic actions.

15. The system in accordance with claim 10 wherein the features further comprise a pose feature, and wherein the feature extractor further extracts a set of pose vectors from each of the plurality of atomic actions, and wherein the motion recognition module convolves histograms of the pose features of each of the plurality of atomic actions by deriving a pose descriptor by determining a histogram-of-oriented gradient of the set of pose vectors for each of the plurality of atomic actions.

16. The system in accordance with claim 10 wherein the features further comprise a spatial feature, and wherein the feature extractor derives each of a set of shape, motion or pose vectors for each of two or more regions of a bounding box within each of the plurality of atomic actions, the bounding box in each of the plurality of atomic actions configured to include all of a subject pictured in the one of the plurality of atomic actions, and wherein the motion recognition module convolves histograms of each of the shape, motion or pose descriptors to generate a resultant histogram.

17. The system in accordance with claim 10 wherein the motion recognition module normalizes the histograms of each of the plurality of atomic actions to sum up to unity.

18. A system for human motion recognition comprising:
a video sequence decomposer for decomposing a video sequence into a plurality of atomic actions;
a feature extractor for extracting features from each of the plurality of atomic actions, the features comprising at least a motion feature and a shape feature; and
a motion recognition module for performing motion recognition for each of the plurality of atomic actions in response to the features, wherein the motion recognition module further comprises a bag-of-words model module for K-means clustering of all of the atomic actions to generate a distance weighted bag-of-automatic-actions model of the video sequence.

* * * * *